UNITED STATES PATENT OFFICE.

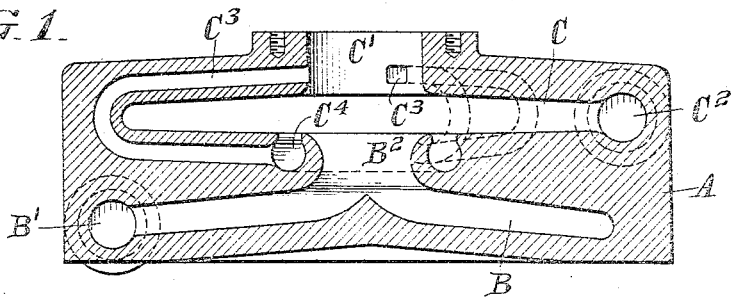
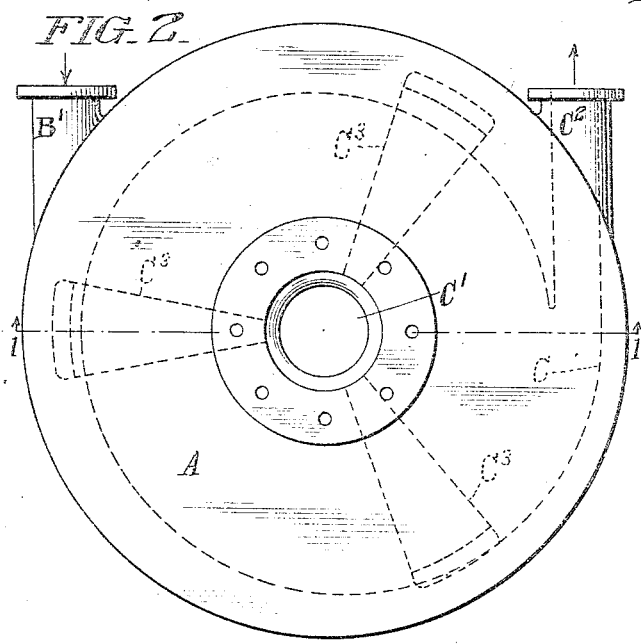
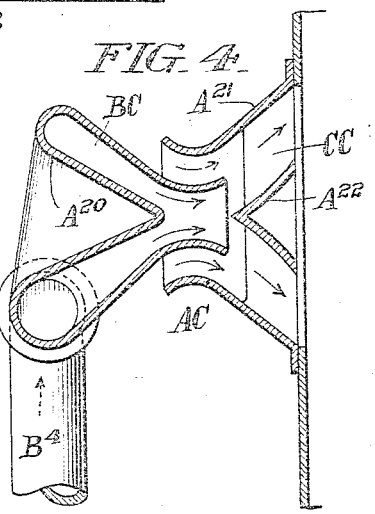
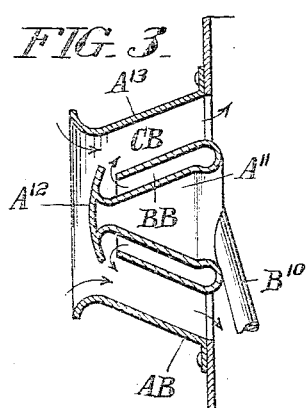
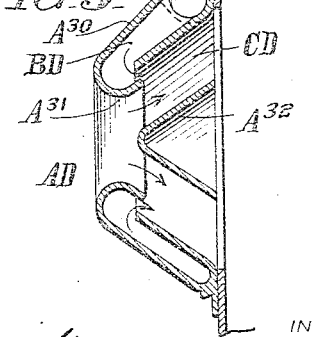

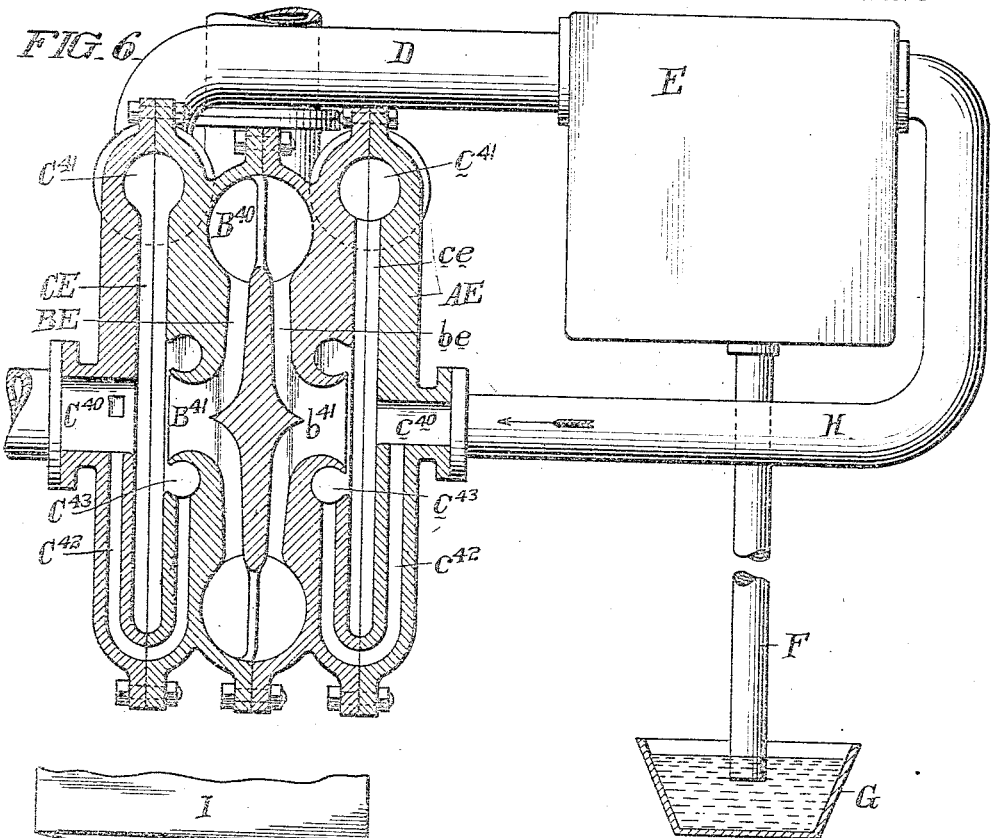
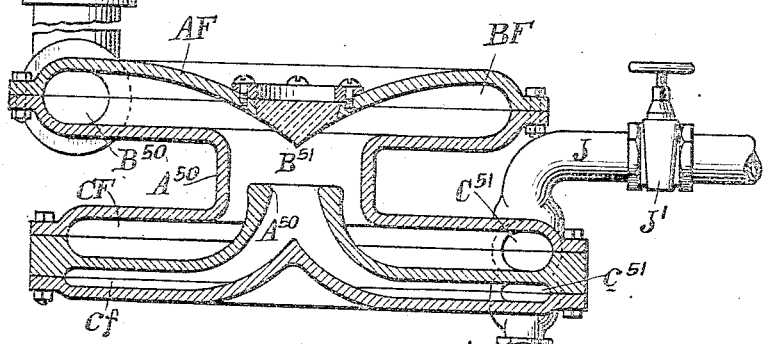

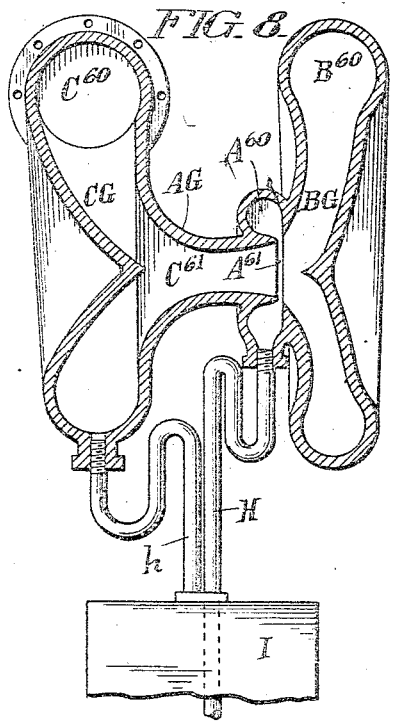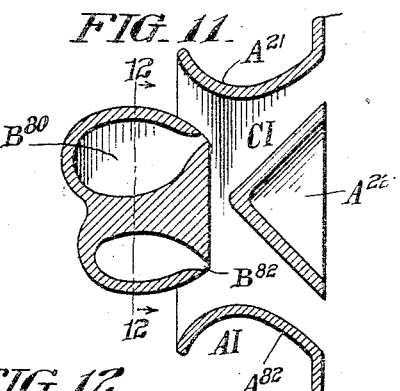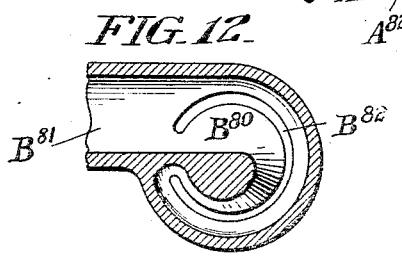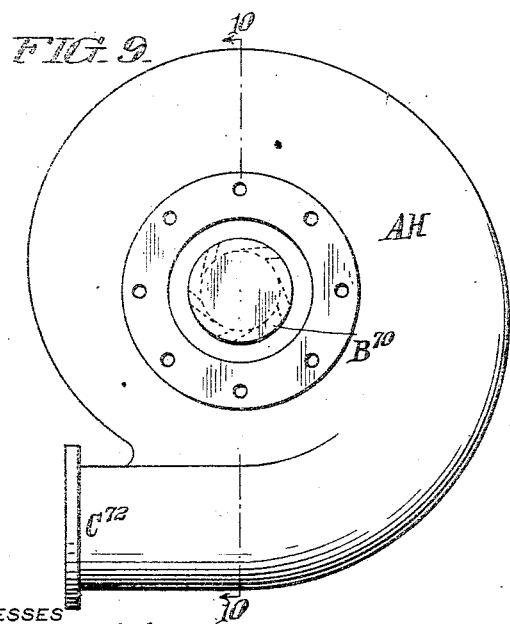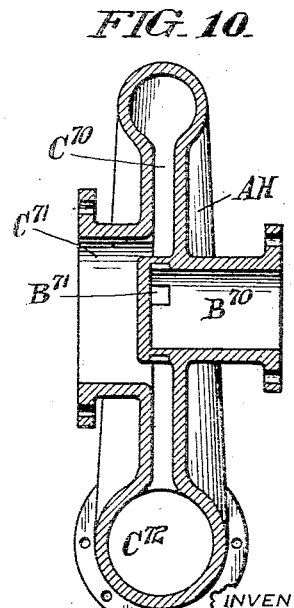

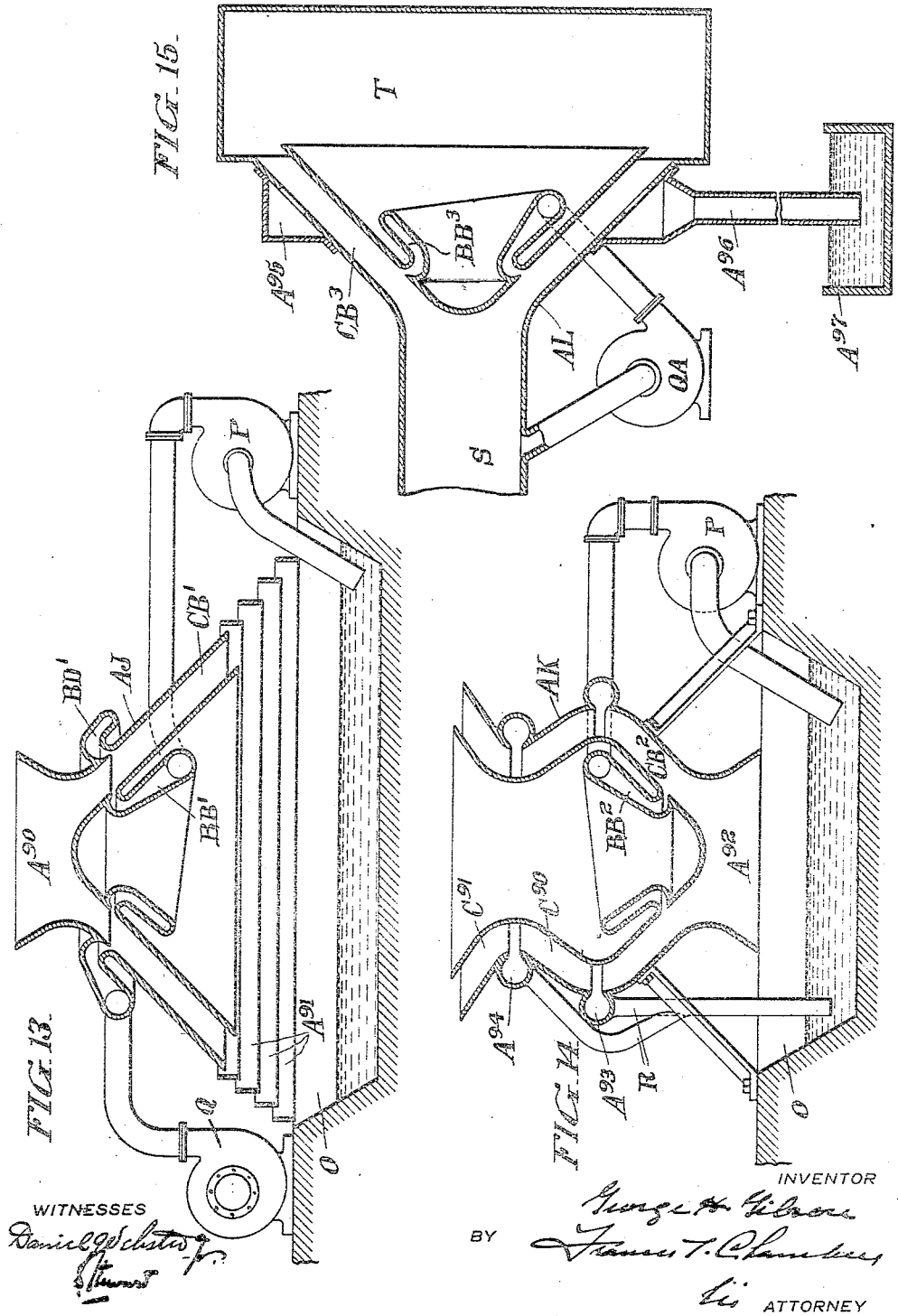

GEORGE H. GIBSON, OF MONTCLAIR, NEW JERSEY.

FLUID-HANDLING MECHANISM.

1,168,297.

Specification of Letters Patent.

Patented Jan. 18, 1916.

Application filed January 20, 1914. Serial No. 813,241.

*To all whom it may concern:*

Be it known that I, GEORGE H. GIBSON, a citizen of the United States of America, residing in Montclair, in the county of Essex and State of New Jersey, have invented a certain new and useful Improvement in Fluid-Handling Mechanism, of which the following is a true and exact description, reference being had to the accompanying drawings, which form a part thereof.

My present invention consists in improved apparatus for separating and mixing fluids, and in particular for so mixing two fluids that the available energy of one fluid will be effectively utilized in raising the pressure of, or giving velocity to the other fluid.

The primary object of my invention is to provide static apparatus for effecting the purposes described above, which shall be simple, compact, relatively inexpensive to manufacture, and reliable and efficient in operation.

A characteristic feature of my invention is the manner in which I employ means utilizing the law known as conservation of the moment of momentum, to effect a conversion of potential energy of pressure of the fluid handled into kinetic energy of velocity or vice versa. This I accomplish by causing the fluid to pass through a spiral path so that as the radius of gyration of the fluid is thus decreased or increased, the velocity of the fluid is increased or diminished, while the pressure is correspondingly decreased or increased.

In order that the apparatus embodying my invention may be employed in separating two fluids, it is necessary that the fluids should be of different specific gravities, and one of the fluids must be, and both may be, liquids. When the apparatus is used in effecting a mixture of two fluids, however, the fluids may be both liquids or both gaseous or one liquid and the other gaseous, though the invention is perhaps of highest utility when employed in mixing a liquid with a gaseous fluid in order to increase the pressure or give motion to the latter.

The various features of novelty which characterize my invention are pointed out with particularity in the claims annexed to and forming a part of this specification. For a better understanding of the invention however, and of the advantages possessed by it, reference should be had to the accompanying drawings and descriptive matter, in which I have illustrated and described several forms in which my invention may be embodied.

Of the drawings: Figure 1, is a sectional elevation of an ejector, the section being taken on the line 1—1 of Fig. 2; Fig. 2 is a plan of the ejector shown in Fig. 1; Figs. 3, 4 and 5 are sectional elevations, each of a different form of ejector or aspirator; Fig. 6 is an elevation partly in section of a compound ejector; Fig. 7 is a sectional elevation of a cream separator; Fig. 8 is a sectional elevation of a steam and oil separator; Fig. 9 is an elevation of another form of ejector or aspirator; Fig. 10 is a section on the line 10—10 of Fig. 9; Fig. 11 is a sectional elevation of still another form of ejector or aspirator; and Fig. 12 is a section on the line 12—12 of Fig. 11; Fig. 13 is a sectional elevation of a device adapted for use in humidifying gases and cooling liquids; Fig. 14 is a sectional elevation of a modified form of device for the same purpose as that shown in Fig. 13; and Fig. 15 is a sectional elevation of apparatus employed to give draft to and remove cinders from furnace gases.

The device A shown in Figs. 1 and 2 of the drawings comprises a casing formed with an annular chamber B. The chamber B is provided at its periphery with a tangential inlet B', and at its center with an axial outlet B² which opens into an annular chamber C formed in the casing of the apparatus. The chamber C has a peripheral discharge C² which preferably, though not necessarily, leads tangentially away from the chamber C. The chamber C is also provided with an axial inlet C', and advantageously channels C³ are formed in the casing leading from the inlet passage C', to a channel C⁴ which surrounds the outlet passage B² from the chamber B, and is open at the margin of the latter to the chamber C. Preferably, as shown, the chambers B and C each comprise a central body portion of radius $b$ or $c$ the side walls of which are surfaces of revolutions and a volute portion surrounding the body portion of the chamber and in open communication therewith at the periphery of the latter, the tangential inlet B' or outlet C², as the case may be, forming a tangential extension, so to speak, of this volute chamber at the larger end of the latter.

The device shown in Figs. 1 and 2 is especially adapted for use as an ejector; in which air entering the apparatus through the inlet C' is compressed and set in motion by water or some other liquid admitted to the chamber B through the peripheral inlet B' under pressure. The water or other impelling fluid thus entering the chamber B tangentially at the periphery of the latter under a suitable pressure, passes through a spiral path to the outlet $B^2$. As the radius of gyration of the path decreases, the velocity of flow of the impelling fluid increases in accordance with the law of conservation of moment of momentum. The increase in velocity and kinetic energy of the impelling fluid in passing through the chamber B is accompanied by a corresponding reduction in pressure and potential energy, and the apparatus may readily be so designed that the static pressure of the water when discharged at the central outlet $B^2$ from the chamber B will be practically nil, so that the apparatus is well adapted for maintaining a vacuum. For instance, the inlet C' may be connected to the air outlet from a vacuum condenser, and the device used to withdraw the air from and maintain the vacuum in the condenser. With properly designed and operated apparatus the water will issue from the chamber B through the outlet $B^2$ at such a high tangential velocity that the water will be discharged into the chamber C in the form of a fine mist, which is its most efficient form for the efficient and quantitative admixture therewith of air entering the chamber C through the inlet C'. As the mixture of air and water vapor thus formed passes outward toward the periphery of the chamber C, it acquires a spiral movement and consequently it loses velocity and increases in pressure, and thus may be discharged through the outlet $C^2$ against a pressure substantially above that in the inlet C'.

It will be apparent of course that when such a device as is shown in Figs. 1 and 2 is used at the air outlet of a condenser, the water serving as the impelling fluid forms an effective condensing agent for disposing of the steam mixed with the air entering the apparatus.

Pressure reducing and compressing or diffuser chambers of apparatus generally the same in purpose and mode of operation as that shown in Fig. 1, may be shaped and relatively arranged in many different ways; and in Figs. 3, 4 and 5 I have shown three modified forms of apparatus of this general kind. The device AB shown in Fig. 3, is of a form especially adapted for use in moving relatively large volumes of air with but slight change in pressure, by means of a comparatively small volume of impelling air supplied at high pressure. In the apparatus shown in Fig. 3 high pressure impelling air is admitted with a considerable tangential velocity to the base or larger end of an annular chamber BB, which is formed between the two coaxial conical walls of a chambered member $A^{11}$. Air issuing with a high circumferential velocity from the smaller end of the chamber BB has the component of its velocity parallel to the elements of the conical walls of the member $A^{11}$ reversed by the flange $A^{12}$, and directed into the smaller end of the annual space CB formed between the outer wall of the member $A^{11}$ and the inner wall of a conical member $A^{13}$ coaxial with and surrounding the member $A^{11}$. The high pressure impelling air discharged in the manner described into the chamber CB is very effectively mixed therein with the air sucked into the chamber CB, and this is essential for an effective utilization of the energy of the high pressure air in moving relatively large volumes of air through the chamber CB with little change in pressure. The device shown in Fig. 3 unchanged except preferably in proportions may be used as an air moistener, in which case water under pressure will be supplied to the chamber BB through pipe $B^{10}$.

The apparatus shown in Fig. 4 is suitable for use in the same general manner as that shown in Fig. 3, but differs therefrom in that the impelling liquid passing through the chamber BC formed between coaxial conical walls is discharged into an annular chamber CC which is formed between a cone $A^{22}$ and a surrounding conical member $A^{21}$, without the reversal in flow characteristic of the apparatus shown in Fig. 3. In Fig. 3 the apices of the various conical surfaces all point in the same direction, whereas in Fig. 4, the apex of the cone $A^{22}$ points toward the member $A^{20}$, and the apices of the conical walls of the member $A^{20}$ point in the opposite direction.

The device AD shown in Fig. 5, is intended for the same purposes as those shown in Figs. 3 and 4. In the device AD the apices of the various conical surfaces forming the walls of the chambers BD and CD all point in the same direction as in Fig. 3, but the device AD differs from the device AB in that the annular chamber BD, through which the impelling fluid is passed, surrounds the mixing chamber CD. The inner wall of the chamber CD is formed by a cone $A^{32}$ and the inlet to the chamber CD for the low pressure air is through a passage formed by the portion $A^{31}$ of the member $A^{30}$ provided to reverse the axial direction of flow of the impelling fluid. Those skilled in the art will understand that in order to obtain the highest efficiency, each annular velocity increasing and diffusion chamber in such apparatus as is shown in the drawings must be shaped and proportioned to insure a quiet and uniform flow through the chamber and to minimize the frictional resistance to this flow. The proper proportioning of such a chamber requires that the maximum diameter of the chamber proper, the diameter of the central port opening to the chamber, and the axial dimensions or thickness of the chamber at varying distances from the center, should bear certain relations to one another, and to the volume, pressure and velocity of the fluid passing through, determined in any given case from known laws governing the flow of fluids.

The compound ejector AE shown in Fig. 6, comprises a low pressure mixing chamber CE which, with its inlet $C^{40}$, tangential discharge $C^{41}$, passages $C^{42}$ and channel $C^{43}$, may be and is shown as being substantially identical with the chamber C, inlet C', outlet $C^2$, passages $C^3$ and channel $C^4$ of Figs. 1 and 2. The chamber BE for the impelling fluid has an outlet $B^{41}$ discharging into the chamber CE, as the chamber B opens into the chamber C through the outlet $B^2$ in Fig. 1. The impelling fluid is supplied to the chamber BF at the periphery thereof through the tangential inlet $B^{40}$. The mixture of the impelling fluid with the fluid entering the chamber CE through the inlet $C^{40}$ is discharged at $C^{41}$ and passes through the pipe D to a separating chamber E. The latter is provided with a liquid drain pipe F discharging at its lower end into the receptacle G, and is provided with an outlet for gaseous fluid connected by the pipe H to the inlet $c^{40}$ of the chamber ce of the device AE. The chamber ce is shown as coaxial and similar in construction and arrangement to the chamber CE, and receives impelling fluid from the chamber be through the outlet $b^{41}$ from the latter. The chamber be, which is shown as coaxial with and similar in construction to the chamber BE, receives impelling fluid at its periphery from the same tangential inlet $B^{40}$ as does the chamber BE. Assuming that the apparatus shown in Fig. 6 is to maintain a vacuum of twenty-nine inches at the inlet $C^{40}$ while discharging the air sucked into the apparatus through that inlet against the pressure of the atmosphere at the final gaseous outlet $c^{41}$. In this case, water would be supplied at such velocity and pressure that the portion, approximately half, of the water thus supplied passing through the chambers BC and CE of the high pressure stage of the apparatus, will create a pressure at the outlet $C^{41}$ and in the separating chamber E of six inches. Under such conditions the water passing through the chambers be and ce of the low pressure stage of the apparatus will raise the pressure of the gaseous fluid withdrawn from the separating chamber E through the pipe H from a pressure corresponding to twenty-four inches of vacuum up to atmospheric pressure.

The characteristic features of my invention may be embodied in apparatus employed for separating two liquids of different specific gravities; and in Fig. 7 I have shown an apparatus of this sort. The device AF shown in Fig. 7 is intended for operation as a cream separator. The milk from which the cream or butter fat is to be separated is admitted to an annular chamber BF under a suitable pressure and at a suitable velocity through the peripheral and tangentially directed inlet $B^{50}$, and is discharged from the chamber BF through the axial outlet $B^{51}$. The outlet $B^{51}$ of the chamber BF opens directly into the coaxial annular milk receiving chamber CF, having a tangential outlet $C^{51}$. A tubular part $A^{50}$ passing centrally through the chamber CF projects into the outer end of the passage $B^{51}$ without filling the latter. In operation, the cream which passes out of the chamber BF through the tubular part $A^{50}$, passes through the latter into a cream receiving and compressing chamber cf having a tangential peripheral outlet $c^{51}$. The raw milk from which the cream is to be separated passes to the apparatus from the overhead reservoir I, through the pipe I' and the throttling valve $I^2$ in the latter. A discharge pipe for the milk from which the cream has been separated is connected to the outlet $C^{51}$ of the chamber CF, and is provided with a throttling valve J'. Similarly the discharge pipe K having a throttling valve K' in it is connected to the outlet $c^{51}$ from the chamber cf. When the milk from which the cream is to be separated is admitted to the chamber BF through the tangential inlet $B^{50}$ at a suitable velocity, the centrifugal action on the raw milk passing spirally through the chamber BF and through the outlet $B^{51}$ causes the lighter cream particles to be collected at the center of the chamber BF and outlet $B^{51}$ and to be surrounded by a tubular shell of the heavier milk residue. In operation the flow velocities are so adjusted that a tubular stream of milk from which the cream has been separated will continually flow from the chamber BF into the chamber CF through the outlet $B^{51}$; while the cream collecting at the center of the chamber BF, will be drawn off from the latter through the tubular part $A^{50}$ into the chamber cf. The pressure and flow conditions necessary to insure an efficient separation of the cream particles from the heavier milk particles, and the passage of all of the milk into the chamber CF and of all the cream into the chamber cf, will be obtained by placing the reservoir I at the proper elevation with respect to the separating apparatus proper, and by adjusting the various valves I', J' and K'. Under some conditions it may be desirable to have the pipe K extend downwardly and dip into a seal vessel, as the pipe F of Fig. 6 dips into the vessel G, and thus provide a barometric column discharge which will make it possible to readily dispose of the cream, even though the pressure in the outlet $c^{51}$ is below that of the atmosphere. The great simplicity in construction and operation of the separating apparatus shown in Fig. 7, as compared with the ordinary centrifugal milk separating machines are obvious. One important feature of the apparatus shown in Fig. 7 is the ease with which it may be cleaned by simply passing hot water or steam through the apparatus.

The device AG shown in Fig. 8 is primarily devised for use in separating liquid particles from a gaseous fluid in which they may be held in mechanical suspension. In particular, this device is intended for use in separating oil from steam. The device comprises a velocity increasing, pressure reducing chamber CG having a tangential inlet $C^{60}$ and connected by an elongated axial outlet passage $C^{61}$ to the center of a diffuser or compressing chamber BG having a peripheral outlet $B^{60}$. An annular passage $A^{60}$ surrounding the discharge passage $C^{61}$ is open to the latter through the annular port $A^{61}$ adjacent the connection of the passage $C^{61}$ to the chamber BG. The seal pipe H leads from the bottom of the chamber $A^{60}$ to a reservoir I, and the seal pipe L leads from the bottom of the chamber $C^{60}$ to the same reservoir. In operation, steam from which the oil is to be separated, is admitted to the chamber CG through the inlet $C^{60}$, and passes from the chamber CG into the chamber BG at a high angular velocity about the axis of the passage $C^{61}$. Under the action of centrifugal force the oil particles previously carried in suspension by the steam are thrown against the wall of the passage $C^{61}$, and travel spirally along the latter to the discharge end of the passage until they reach the annular port $A^{61}$, whereupon they pass into the chamber $A^{60}$. The oil thus collected in the chamber $A^{60}$ passes through a seal pipe H into the reservoir I, and the latter also receives through the pipe $h$ any oil which may collect in the chamber CG. It will be understood of course that the apparatus must be so proportioned and operated that liquid seals will be maintained in the seal loops $h'$ and $H'$, and the only flow through these pipes will be that of the liquid entering the pipes from the chambers CG and $A^{60}$.

While I consider it preferable in most, if not in all cases to impart a high tangential velocity to the fluid delivered to the inlet of the compressing chamber of apparatus embodying my invention, by passing the fluid through an annular velocity increasing and pressure reducing chamber, as in the different forms hereinbefore described, it is possible to employ other means for discharging fluid at a high tangential velocity into the inlet of such a compressing chamber; and in Figs. 9 to 12 I have shown two forms of apparatus of this character.

In the apparatus shown in Figs. 9 and 10, the device AH is intended for use as an air ejector, and comprises an inlet chamber $B^{70}$ for water or other motive fluid which is supplied to the chamber at such a pressure that the water issuing from the latter through the tangential ports $B^{71}$ will have the desired velocity. The tangential streams of water thus discharged through the ports $B^{71}$ pass into a surrounding compressing chamber $C^{70}$ having a tangential outlet $C^{72}$ and provided also with an inlet $C^{71}$ for the air to be injected. The inlet $C^{71}$ communicates with the chamber $C^{70}$ and surrounds the portion of the chamber $B^{70}$ in which the ports $B^{71}$ are formed. The operation of the apparatus shown in Figs. 9 and 10 is essentially the same as the apparatus shown in Figs. 1 and 2 except in so far as the particular means are concerned by which the water is supplied to the compressing chamber. It is not possible, however, to obtain as fine an initial subdivision of the water particles entering the compressing chamber with the apparatus shown in Figs. 9 and 10 as may be had with the apparatus of Figs. 1 and 2.

The device AI shown in Figs. 11 and 12, is intended for use as an aspirator, in much the same manner as are the devices shown in Figs. 3, 4 and 5. The compressing chamber CI is shown as formed of internal and external members $A^{21}$ and $A^{22}$, similar to the corresponding members of the device AC shown in Fig. 4. The impelling fluid in the device shown in Figs. 11 and 12 is given its desired tangential velocity at the inlet to the chamber CI by being passed through the tangential inlet $B^{81}$ into the curved chamber $B^{80}$ which opens to the chamber CI through the outlet $B^{82}$ which is in the form of a nearly complete circle having its center in line with the axis of the chamber CI.

My invention is well adapted for use in humidifying air or in cooling water by spraying the water to be cooled into atmospheric air or other gaseous cooling medium. One example of apparatus of this particular kind is shown in Fig. 13 wherein O represents a well or reservoir of a condensing plant and P represents a pump drawing water from the well and discharging into the tangential inlet of a velocity increasing chamber BB' of a device AJ, the chamber BB' of which discharges in turn into the compressing chamber CB'. The chambers BB' and CB' correspond in shape and general arrangement to the chambers BB and CB of Fig. 3. A fan Q delivers high pressure air into the peripheral inlet of a chamber BD' which discharges into the chamber CB' and bears the same general relation to the latter as does the chamber BD to the chamber CD in Fig. 4. In operation the high pressure air and water discharged from the chambers BD' and BB' into the chamber CB' draw air into the latter chamber through the inlet $A^{90}$ and this air, as well as that passing through chamber BD' is highly effective in abstracting heat from and is humidified by the water sprayed into the chamber CB'. At the bottom of the chamber CB' the water may fall back into the well O while the air may escape to the atmosphere in the spaces between the courses or baffles $A^{91}$.

The device AK shown in Fig. 14 is of the same general character and for the same general purpose as that shown in Fig. 13, but the chambers $BB^2$ and $CB^2$, corresponding to the chambers BB' and CB' of Fig. 13, are inverted and the low pressure air inlet $A^{92}$ is at the bottom of the chamber $CB^2$. To insure an effective removal of water from the air leaving the device, the chamber $CB^2$ proper is extended at its upper end to form a converging or velocity increasing chamber $C^{90}$ and a compressing chamber $C^{91}$ and water collecting chambers $A^{93}$ and $A^{94}$ are provided. The chamber surrounds the air channel formed by chambers $CB^2$ $C^{90}$ and $C^{91}$ and opens to this channel at the top of the chamber $CB^2$. Similarly the chamber $A^{94}$ surrounds the air channel and opens to the later at the top of the chamber $C^{90}$. R represents drain piping leading from the chambers $A^{93}$ and $A^{94}$ back to well O. The water discharged into the air channel runs back to the well O along the outer wall of the channel or through chambers $A^{93}$ and $A^{94}$ and piping. In this form the natural updraft and the aspirating effect of the water jet are relied upon to give the desired flow of air through the apparatus. It will be understood of course that the fan Q and chamber BD' of Fig. 13 may be dispensed with in some cases.

In Fig. 15 I have illustrated the use of my invention in a device AL adapted to give draft to the furnace gases passing through it and also to utilize the high peripheral velocity imparted to the gases for separating cinders out of the gas. In Fig. 15, T represents a main smoke flue and S the smoke flue from an individual boiler. The flue S is connected to the flue T by a chamber $CB^3$ and QA represents a fan drawing gases from the flue S and discharging into the chamber $BB^3$ which discharges in turn into the chamber $CB^3$. The chamber $BB^3$ and fan QA form effective draft producing means. Cinders passing through the chamber $CB^3$ and impelled by centrifugal force against the outer wall thereof enter the surrounding collection chamber $A^{95}$ and are discharged through the pipe $A^{96}$ into the vessel $A^{97}$ which contains water sealing the lower end of the pipe $A^{96}$.

While in accordance with the provisions of the statutes I have illustrated and described the best forms of my invention now known to me, it will be apparent to those skilled in the art that changes may be made in the form of apparatus disclosed without departing from the spirit of my invention, and that under some conditions certain features of my invention may be used without a corresponding use of other features.

Having now described my invention, what I claim as new and desire to secure by Letters Patent, is:

1. A fluid jet ejector comprising a stationary annular chamber having a peripheral outlet and a central inlet for the impelling fluid and the fluid ejected, and stationary means for discharging the impelling fluid into said chamber said means comprising a discharge orifice through which the impelling fluid is discharged with a high velocity tangential to a circle coaxial with said chamber and with such direction of flow as to carry the impelling fluid directly into said chamber.

2. A device for the purpose specified comprising a stationary annular velocity increasing chamber having a tangential peripheral inlet and a central outlet, and a stationary annular compressing chamber having a peripheral outlet and open centrally to receive the tangential discharge from the outlet of the first mentioned chamber and to permit the passage through one of said chambers of a fluid not flowing through the other.

GEORGE H. GIBSON.

Witnesses:
PAUL A. BAUCEL,
STANLEY D. BROWN.